May 10, 1966  S. BOWIE  3,250,982
ELECTRO-MAGNETIC APPARATUS FOR CONVERTING MECHANICAL
DISPLACEMENTS INTO ELECTRICAL VOLTAGES
Filed Nov. 19, 1962  2 Sheets-Sheet 1
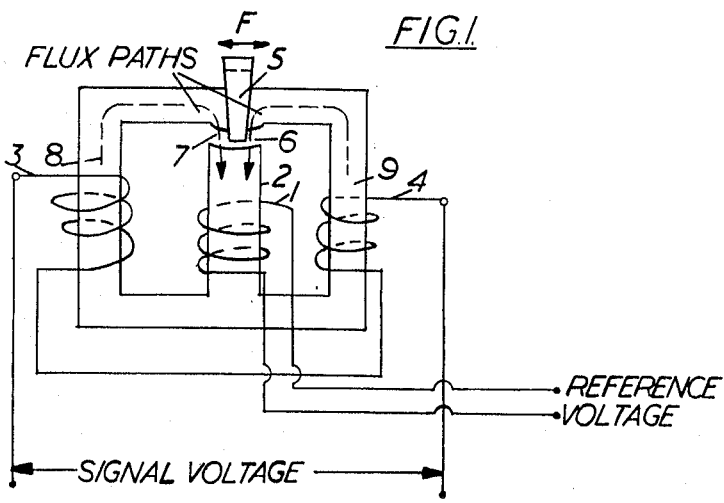
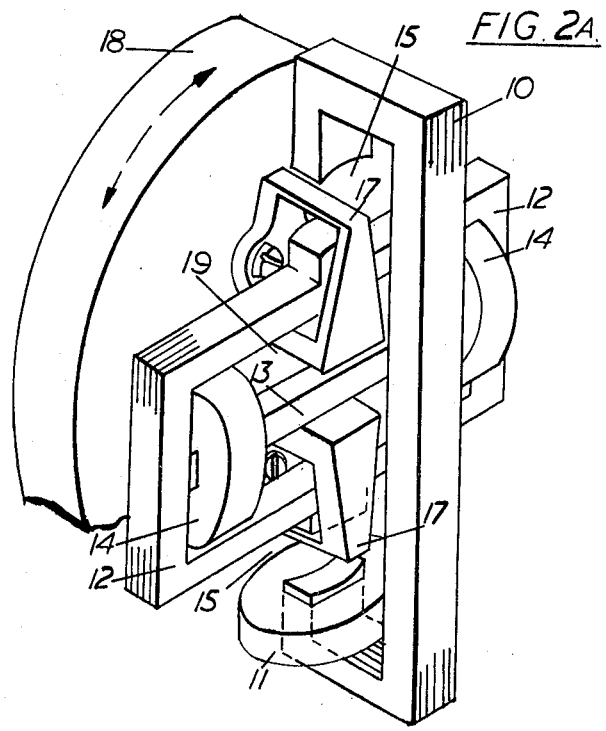
Inventor
Stanley Bowie
By Dowell & Dowell
Attorneys May 10, 1966   S. BOWIE   3,250,982
ELECTRO-MAGNETIC APPARATUS FOR CONVERTING MECHANICAL
DISPLACEMENTS INTO ELECTRICAL VOLTAGES
Filed Nov. 19, 1962   2 Sheets-Sheet 2

Inventor
Stanley Bowie
By Dowell H Dowell
Attorneys

United States Patent Office 3,250,982
Patented May 10, 1966

3,250,982
ELECTRO-MAGNETIC APPARATUS FOR CONVERTING MECHANICAL DISPLACEMENTS INTO ELECTRICAL VOLTAGES
Stanley Bowie, Bramhall, England, assignor to A. V. Roe & Co. Limited, Middleton, Manchester, England
Filed Nov. 19, 1962, Ser. No. 238,437
Claims priority, application Great Britain, Nov. 17, 1961, 41,322/61
10 Claims. (Cl. 323—50)

The present invention relates to electro-magnetic apparatus for converting limited rotary or linear mechanical displacement into an A.C. electrical voltage, the magnitude and phase of which, relative to the reference voltage, is a function of the input displacement.

An example of one known type of such device is shown diagrammatically in FIGURE 1 of the accompanying drawings. It is a differential transformer consisting basically of one primary coil 1 on the centre limb of a laminated soft magnetic core 2, and two secondary coils 3, 4 situated on the two outer limbs 8, 9 of the same core and connected electrically in anti-phase, the voltage across the free ends of these two coils being the output signal voltage. The flux linking the primary coil 1 with the secondary coils 3, 4 is proportioned between the two outer limbs by the mechanical displacement of a shorted turn of non-magnetic electrically conducting material 5 surrounding the top bridge of the core at a roughly central position. Because this shorted turn prevents any magnetic flux passing through it, the primary flux divides proportionally to the pole face areas on either side of the shorted turn. The varying distribution of flux in the two secondary limbs 8 and 9 produces a corresponding variation of the voltages in the two secondary coils 3, 4. Provided the primary air gap 6, 7 is constant across the whole pole surface the differential voltage in the secondary coils will vary in a linear manner with the mechanical displacement of the shorted turn 5 in the direction of the arrows F.

Such devices are usually arranged so that the two secondary coil voltages at mid travel of the shorted turn are equal in magnitude (ideally in exact anti-phase). At this, the datum position, the signal voltage of fundamental frequency is zero. However, due to iron losses in the magnetic core, the fluxes linking the two output coils are rarely in exact anti-phase and also the coil impedances are rarely equal. This gives rise to voltages at the null of harmonic frequencies and to a fundamental frequency shifted 90° with respect to the signal voltage.

In order to minimise the magnetic impedances (to make their difference as small as possible) in the two flux paths 8 and 9, it is necessary to interleave the laminations composing the magnetic core and in general to cement them together after interleaving. This interleaving makes it difficult, if not indeed impossible, to grind or machine the pole faces of the gap containing the shorted turn, so that laminations of extremely high dimensional accuracy must be used, very precisely interleaved. It is an object of the invention to overcome this disadvantage.

According to the present invention, there is provided an electro-magnetic device for converting limited rotary or linear mechanical displacement into an electrical voltage, comprising a primary magnetic core structure bearing one or more primary or field coils, a separate secondary core structure bearing one or more output coils and defining with the primary core a pair of air gaps, and a pair of shorted turns disposed around limbs of the secondary core, one at each gap, at least one of the shorted turns being subject to the aforesaid mechanical displacement relative to the cores, and the arrangement being such that a magnetic bridge is formed in which the magnetic impedances of the air gaps on opposite sides of the shorted turns constitute four bridge arm impedances while the output coils are comprised in an output diagonal of the bridge, the field input being applied across the other diagonal.

In this arrangement, the primary and secondary iron circuits are completely separated by two air gaps, each containing a shorted turn. This greatly eases manufacture since interleaving of primary and secondary parts of the magnetic core is no longer required, and the laminations of each part may be cemented together and the pole faces ground, before the primary and secondary parts are assembled with one another.

The two or more secondary or output coils in phase opposition are replaced by one or more output coils connected in series and in phase. This eliminates the fundamental quadrature voltage at the null arising from impedance dissimilarities in secondary coils in phase opposition.

One embodiment of this invention, particularly suitable for use as a pick-off in the sensing or measurement of the limited rotational movement of the gimbal of a rate gyroscope, will now be described by way of example and with reference to the accompanying drawings in which:

FIG. 1 shows a known type of apparatus for converting mechanical displacements into electrical voltages.

FIGURE 2A is a view in perspective of the device to be described,

The device shown in FIGURE 2A has a primary C-shaped magnetic core 10 on which are mounted one or more primary coils 11, connected in series and in phase if there are more than one, these generally being situated at the extremes of the core in order to minimise magnetic leakage. The primary coils are energised by an external A.C. supply.

Figure 2B:
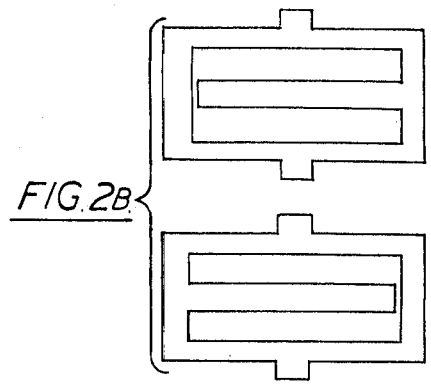
FIGURE 2B shows the nature of individual laminations employed in the secondary core structure of the device.

Between the inward facing poles of the primary core a secondary core 12 is situated, on a centre limb 13 of which one or more secondary coils 14 are mounted, again connected in series and in phase if there are more than one. It is appropriate to mention that in order to make possible assembly of the coils 14 on the centre limb alternate laminations of the core 12 are made as shown in FIGURE 2B, with an interruption or gap at one end of each centre limb and the gaps in consecutive laminations disposed at opposite ends of the core, it then being possible, by flexing, to thread the centre limbs of the laminations through the coil bobbins 14 alternatively from left and right. The secondary limbs are cemented together while the secondary coils are in place, and the pole faces forming the gaps 15 can then be ground as required. The effect of interleaving the centre limb 13 is of minor importance since matching of two magnetic circuits is no longer involved.

Shorted turns 17 occupy the two gaps 15 and are mechanically secured to a member 18 whose rotation is being measured, the axis of rotation being approximately normal to, and passing through the mid point of, a line joining the two air gaps 15, i.e. approximately at the mid point of the centre limb 13 of the secondary core. The shorted turns have thick parts passing through the windows 19 in the secondary core as shown in FIGURE 2A, the secondary windings 14 generally being in two parts in order to give operating clearance for the shorted turns 17. It will be noted that the relatively heavy thick parts of the shorted turns are situated close to the axis of rotation, so minimising the moment of inertia of these moving parts.

Both primary and secondary cores are rigidly clamped to a common frame (not shown) which supports, on suitable pivots, the member 18 whose rotation is being measured.

Figure 3:
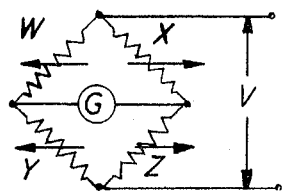
FIGURE 3 shows the electrical analogue of the magnetic circuits of the device.

By way of explanation of how the pick-off works the electrical analogue of the magnetic circuit is shown in FIGURE 3, in which variable resistances W, X, Y and Z form the four legs of a Wheatstone bridge, energised by an alternating supply voltage V. A galvanometer G connects the junctions of W, Y and X, Z respectively.

Figure 2C:
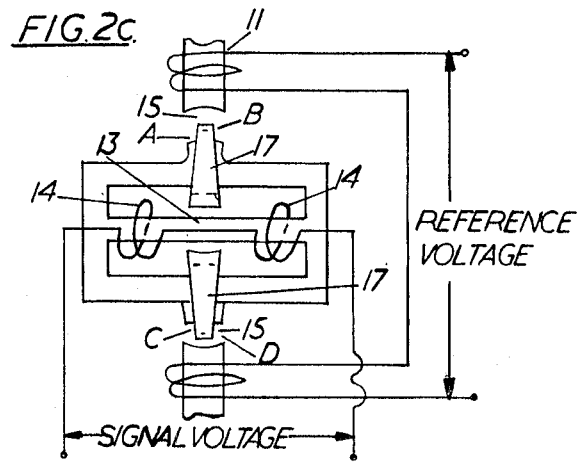
FIGURE 2C illustrates the circuits of the device diagrammatically.

Referring to FIGURE 2C the magnetic impedance of the pick-off corresponds to the Wheatstone bridge as follows: The variable impedances of the air gaps 15, on either side of the shorted turns, are A, B, C and D, corresponding to the resistances W, X, Y and Z respectively of the Wheatstone bridge, and the secondary coils 14 correspond to the galvanometer G. It is a requirement at the null position of the pick-off that the magnetic gradient along the centre limb 13 at fundamental frequency should be nil, so that no flux at the fundamental frequency is linking with the secondary coil or coils. This situation corresponds to the Wheatstone bridge when in balance, with no voltage across the galvanometer G.

This condition is met in the pick-off when $$A/C = B/D$$

and in the electrical bridge when $$W/Y = X/Z$$

This relationship will be maintained, to a first order of accuracy, in the pick-off after both shorted turns are displaced an equal amount in the same direction to left or right in FIGURE 2C, so that very precise location of the centre of rotation of the shorted turn assembly on the moving member is not required, and this is of considerable importance in easing the manufacture of the pivots supporting the rotating body and shorted turns. It is already well known that small displacements of the shorted turns towards one pole or the other (in a vertical direction in FIGURE 2C) do not affect the impedances.

The same relation will also be maintained to a first order if the two gaps 15 are not of exactly equal lengths, so that the mechanical clamping of the primary and secondary cores to a common frame is not a matter requiring very high dimensional precision. This again is a constructional advantage.

A further constructional advantage is that the looping of each shorted turn, which has to be soldered round the corresponding limb of the secondary core, can be performed in the absence of the primary core and coil assembly, so giving greater access for this operation.

Again the complete secondary assembly with shorted turns can be clamped in the instrument housing, and the shorted turns attached to the moving member and positionally adjusted in the absence of the primary core which may be attached later.

The device as so far described employs two rotating shorted turns. By clamping one shorted turn in the mid position of its air gap and moving the other shorted turn in a rectilinear or rotational manner across the other gap, the device will perform as a magnetic bridge as before but with halved sensitivity.

The particular arrangement described gives a greatly reduced fundamental quadrature voltage at the null position; reduced harmonic voltages in the signal at the null position due to the more uniform secondary magnetic circuit; greatly eased mechanical construction and reduced requirements for dimensional accuracy of the magnetic cores; and in the case of a rotary pick-off, reduced sensitivity to slop in the bearings supporting the input member.

I claim:

1. An electro-magnetic device for converting mechanical displacement into an electrical voltage, comprising a primary magnetic core structure bearing at least one primary coil, a separate secondary core structure normal to said primary core structure and, having at least two substantially parallel limbs which define with the primary core a pair of air gaps, a pair of shorted turns disposed one around each of said two limbs of the secondary core, one at each gap, at least one of the shorted turns being subject to mechanical displacement relative to the cores, said secondary core structure further including bridge portions connecting said parallel limbs to one another at their ends and so forming a magnetic bridge circuit in which the magnetic impedances of the air gaps on opposite sides of the shorted turns constitute four bridge arm impedances and at least one output coil on said secondary core structure.

2. A device according to claim 1, wherein the primary core structure is substantially C-shaped with well-separated poles, and the secondary core structure is disposed in the gap between these poles with said parallel limbs thereof substantially normal to the general plane of the C.

3. A device according to claim 2, wherein the secondary core structure has three parallel limbs, the centre one of which bears the output coil while the outer two define the air gaps with respective poles of the primary structure, these three limbs being united across their ends by said bridging portions of the secondary core structure.

4. A device according to claim 3, wherein at least one shorted turn is mounted for limited angular movement about a rotational axis which is within the general plane of the C-shape of the primary core structure and normal to the general plane of the limbs of the secondary core structure, said axis passing substantially through the mid point of the centre limb of the secondary core and the mid point of the primary C.

5. A device according to claim 4, wherein the two shorted turns are mounted for angular movement in unison about said axis.

6. A device according to claim 1, wherein there are at least two output coils arranged in series and in phase with one another.

7. A device according to claim 5, wherein the secondary core structure is built up of laminations each of which has a break at one end of its centre limb between that limb and the bridge portion of the core across that end, the laminations being stacked with consecutive laminations having these breaks at opposite ends of the core.

8. An electro-magnetic device for converting mechanical displacement into an electrical voltage, comprising a generally C-shaped primary magnetic core structure with well-separated poles, at least one primary coil on said primary core structure, a separate secondary core structure consisting of two spaced parallel outer limbs and bridging portions uniting their ends in a substantially rectangular configuration with a third parallel limb central between said two outer limbs and having its ends united to the mid points of said bridging portions, said secondary core structure being disposed between the poles of said primary structure with its parallel limbs substantially normal to the general plane of the C and each of said two outer limbs defining with a different one of said poles an individual air gap, a pair of shorted turns disposed one around each of said two outer limbs of the secondary core structure, one at each gap, at least one of the shorted turns being subject to mechanical displacement relative to the core structure in a direction transverse to said plane, and a pair of secondary coils on said central limb.

9. A device according to claim 8, wherein said two shorted turns are mounted for limited angular movement in unison about a rotational axis which is within the general plane of the C-shape of the primary core structure and normal to the general plane of the secondary core structure.

10. An electro-magnetic device for converting mechanical displacement into an electrical voltage, comprising a primary magnetic core structure with well-separated poles, at least one primary coil on said primary core structure, a separate secondary core structure normal to said primary core structure and, consisting of two spaced parallel outer limbs and bridging portions uniting their ends in a substantially rectangular configuration with a third parallel limb central between said two outer limbs and having its ends united to the mid points of said bridging portions, said secondary core structure being disposed between the poles of said primary structure with each of said two outer limbs defining with a different one of said poles an individual air gap, a pair of shorted turns disposed one around each of said two outer limbs of the secondary core structure, one at each gap, at least one of the shorted turns being subject to mechanical displacement relative to the core structures, and at least one secondary coil on said central limb.

References Cited by the Examiner
UNITED STATES PATENTS
2,207,248 7/1940 Garlick _____ 340—196
FOREIGN PATENTS
727,929 4/1955 Great Britain.

LLOYD McCOLLUM, *Primary Examiner.*

A. D. PELLINEN, D. L. RAE, *Assistant Examiners.*